US011569729B2

(12) United States Patent
Jeon et al.

(10) Patent No.: US 11,569,729 B2
(45) Date of Patent: Jan. 31, 2023

(54) CIRCUIT FOR DETECTING FAILURE OF ZERO VOLTAGE SWITCHING

(71) Applicant: LG ELECTRONICS INC., Seoul (KR)

(72) Inventors: Seonho Jeon, Seoul (KR); Seongho Son, Seoul (KR); Younghwan Kwack, Seoul (KR); Chuhyoung Cho, Seoul (KR); Jongseong Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 278 days.

(21) Appl. No.: 16/987,818

(22) Filed: Aug. 7, 2020

(65) Prior Publication Data

US 2021/0281160 A1 Sep. 9, 2021

(30) Foreign Application Priority Data

Mar. 4, 2020 (KR) .................. 10-2020-0027427

(51) Int. Cl.
*H03F 3/217* (2006.01)
*H02M 1/08* (2006.01)
*H05B 6/12* (2006.01)

(52) U.S. Cl.
CPC .......... *H02M 1/083* (2013.01); *H05B 6/1245* (2013.01)

(58) Field of Classification Search
CPC ...... H05B 6/1245; H05B 6/062; Y02B 70/10; H02M 1/083
See application file for complete search history.

(56) References Cited

U.S. PATENT DOCUMENTS

| 4,868,728 | A | * | 9/1989 | Nuns | ............... | H02M 7/538 |
| | | | | | | 363/17 |
| 2006/0208798 | A1 | * | 9/2006 | Labbe | ............... | H03F 3/217 |
| | | | | | | 330/251 |

(Continued)

FOREIGN PATENT DOCUMENTS

| EP | 2 209 197 | 7/2010 |
| KR | 10-1602474 | 3/2016 |

(Continued)

OTHER PUBLICATIONS

EP2209197 (Year: 2010).*
European Search Report dated Mar. 16, 2021 issued in EP Application No. 20201435.3.

*Primary Examiner* — Jared Fureman
*Assistant Examiner* — Esayas G Yeshaw
(74) *Attorney, Agent, or Firm* — Ked & Associates, LLP

(57) ABSTRACT

Provided is a resonant power conversion apparatus including a gate control circuit that controls a first switch to enter an On state and a second switch to enter an Off state at a first stage and controls the first switch to enter the Off state and the second switch to enter the On state at a second stage, a first current transformer that applies current to the first switch at the first stage and applies current to the second switch at the second stage, a load connected to the first current transformer in series, a second current transformer connected to the second switch, and a microcontroller unit (MCU) that determines whether to be zero voltage switching or non-zero voltage switching based on a current flowing in the first current transformer and the second current transformer in a process of transitioning from the first stage to the second stage.

20 Claims, 12 Drawing Sheets

(56) References Cited

U.S. PATENT DOCUMENTS

| | | |
|---|---|---|
| 2008/0278984 A1 | 11/2008 | Stanley |
| 2010/0181306 A1 | 7/2010 | Gutierrez et al. |
| 2010/0226050 A1 | 9/2010 | Koo et al. |
| 2011/0012677 A1* | 1/2011 | Dooper ................. H03F 3/2173 330/251 |
| 2017/0110973 A1* | 4/2017 | Chen ......................... H03L 7/00 |
| 2017/0208659 A1* | 7/2017 | Hau ....................... H05B 45/39 |

FOREIGN PATENT DOCUMENTS

| | | |
|---|---|---|
| WO | WO 2008/137935 | 11/2008 |
| WO | WO 2014/090864 | 6/2014 |

* cited by examiner

CIRCUIT FOR DETECTING FAILURE OF ZERO VOLTAGE SWITCHING

CROSS-REFERENCE TO RELATED APPLICATION

This application claims priority under 35 U.S.C. § 119 to Korean Application No. 10-2020-0027427 filed on Mar. 4, 2020, whose entire disclosure is hereby incorporated by reference.

BACKGROUND

1. Field

This disclosure relates to technology for detecting a failure of zero voltage switching occurring in a resonant inverter or converter.

2. Background

Various types of cooking appliances may be used in homes and restaurants. For example, gas ranges may use a combustion of a fuel gas to heat food or cookware. In some cases, cooking devices may heat a target heating object, such as a pot or other cooking vessel, using electricity rather than a fuel gas.

Examples of methods for heating a target heating object using electricity include a resistance heating method and an induction heating method. In the electric resistance heating method, heat may be generated due to electrical resistance against a current flowing through a metal resistance wire or a non-metallic heating element such as Silicon Carbide (SIC), and this heat may be transferred to a target heating object (e.g., a cooking vessel) through heat dissipation and/or heat transfer. In the induction heating method, a target heating object may be heated by an eddy current generated in the target heating object made of certain types of metal materials using an electrical field that is generated around a coil when a high frequency power having a predetermined magnitude is applied to the coil.

The induction heating method may be applied to cooktops. For example, the cooktop may heat an object by applying a high-output high-frequency current to a working coil and may include a plurality of switches (e.g., an insulated gate bipolar transistor (IGBT)). The cooktop may control a driving frequency through a switching operation. Such switching may be a zero voltage switching performed for increasing an efficiency of output. To perform the zero voltage switching, the cooktop may be driven in an inductive range. The inductive range and a capacitive range may be distinguished based on a resonant frequency. During the zero voltage switching, an IGBT current may flow after a diode current flows. A length of an interval in which the diode current flows may correspond to phase margins of a current and voltage that does not transition to the capacitive range. When the phase margin is less than zero, the transition to the capacitive range may occur. In this instance, a non-zero voltage switching (Non-ZVS) phenomenon may occur.

Korean Patent No. 10-1602474 discusses a method to detect a failure of zero voltage switching by detecting an interval in which a diode current flows based on characteristics of a voltage and a current and recognizing a width thereof. However, this method may fail to detect a shoot-through phenomenon caused by a small load current that is likely to result in failure of zero voltage switching when driven in the capacitive range. As such, this method generally cannot be applied to the non-zero voltage switching occurring when the small load current flows, to adjust a width of a driving signal, or as a kind of asymmetric technique among power control switching techniques of a power conversion device. Accordingly, there is a desire for technology to detect the non-zero voltage switching occurring when the cooktop is driven at a frequency of the inductive range.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
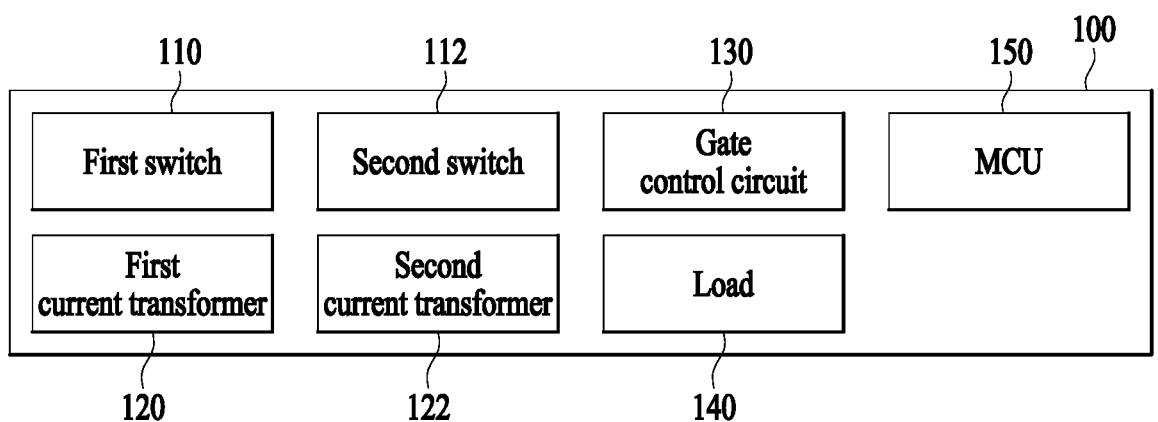
FIG. 1 is a block diagram illustrating a resonant power conversion apparatus according to an example.

FIG. 1 is a block diagram illustrating a resonant power conversion apparatus 100 according to an example. The resonant power conversion apparatus 100 includes a gate control circuit 130 that (i) controls a first switch 110 to be in an On state and a second switch 112 to be in an Off state at a first stage; and (ii) controls the first switch 110 to be in the Off state and the second switch 112 to be in the Off state at a second stage. The resonant power conversion apparatus 100 includes a first current transformer 120 that applies a current to the first switch 110 at the first stage and applies a current to the second switch 112 at the second stage. The resonant power conversion apparatus 100 includes a load 140 connected to the first current transformer 120 in series, a second current transformer 122 connected to the second switch 112, and a microcontroller unit (MCU) (also referred to herein as a controller or control circuit) 150 that determines whether to apply a zero voltage switching or a non-zero voltage switching based on a current flowing in the first current transformer 120 and the second current transformer 122 in a process of transitioning from the first stage to the second stage.

The first switch 110 and the second switch 112 may be alternately transitioned between the On/Off states by the gate control circuit 130. The On state of the first switch 110 or the second switch 112 may correspond to a case in which a driving voltage of the corresponding switch is applied. The Off state of the first switch 110 or the second switch 112 may correspond to a case in which the driving voltage of the corresponding switch is not applied. The gate control circuit 130 may control the on/Off state of the first switch 110 and the second switch 112. The first switch 110 and the second switch 112 may not be in the On state simultaneously, but both first switch 110 and second switch 112 may have a period of being in the Off state for the zero-voltage switching. As such, the gate control circuit 130 may apply a driving voltage to the first switch 110 and the second switch 112 so that a first operation in which the first switch 110 enters the On state and the second switch 112 enters the Off state, a second operation in which the first switch 110 and the second switch 112 both enter the Off state, and a third operation in which the first switch 110 enters the Off state and the second switch 112 enters the On state are repetitively performed.

The first current transformer 120 and the second current transformer 122 may allow a current flowing on a circuit included in the resonant power conversion apparatus 100 to flow to a secondary coil side at a predetermined ratio. For example, primary coil sides of the first current transformer 120 and the second current transformer 122 may be connected to the circuit of the resonant power conversion apparatus 100. Also, a separate load may be connected with a secondary coil corresponding to a primary coil. The first current transformer 120 and the second current transformer 122 may include circuits having various current measuring functions, such as a current transducer (C.T.).

The load 140 may include a target through which the resonant power conversion apparatus 100 receives power and/or outputs the power in various ways. The load 140 may include a resistor component and an inductor component. For example, when the resonant power conversion apparatus 100 is a cooktop for inductively heating a heated object, the load 140 may include an electrical component formed by a working coil and an indication-compatible container (e.g., cookware formed including a ferrous material) placed on an upper plate of the cooktop. In this example, the load 140 may correspond to an equivalent circuit including a resistor component and an inductor component.

The MCU 150 may determine whether a non-zero voltage switching occurs in the first switch 110 or the second switch 112 included in the resonant power conversion apparatus 100. For example, the MCU 150 may determine whether the non-zero voltage switching occurs based on output signals generated in the first current transformer 120 and the second current transformer 122 in response to the occurrence of the non-zero voltage switching, and based on output signals generated in the first current transformer 120 and the second current transformer 122 in response to an occurrence of a zero voltage switching.

The MCU 150 may include a comparator that generates different outputs based on a result of comparison between a first output voltage output from a load of the secondary coil of the first current transformer 120 and a second output voltage output from a load of the secondary coil of the second current transformer 122. The comparator may receive two signals (e.g., the first output voltage and the second output voltage). When the first output voltage is greater than the second output voltage, the comparator may output a High signal. When the first output voltage is less than or equal to the second output voltage, the comparator may output a Low signal.

When an output generated by the comparator is the High signal, the MCU 150 may determine that the non-zero voltage switching occurs. When an output generated by the comparator is the Low signal, the MCU 150 may determine that the zero voltage switching occurs. The first current transformer 120 and the second current transformer 122 may have a substantially same load on the secondary coil sides. The first current transformer 120 and the second current transformer 122 may have, for example, the same turns ratio for the primary coil and the secondary coil.

The outputs may be provided from the secondary coil sides of the first current transformer 120 and the second current transformer 122 to the MCU 150. In a case in which the zero voltage switching occurs, a magnitude of output voltage of the first current transformer 120 may be less than or equal to a magnitude of output voltage of the second current transformer 122. For example, once the zero voltage switching occurs, the same magnitude of current may flow to the primary coil sides of the first current transformer 120 and the second current transformer 122, so that the same current is generated on the secondary coil sides. Thus, when the zero voltage switching occurs, the same magnitude of current may flow in predetermined elements (for example, at least one resistor element) disposed on the secondary element sides so that the same magnitude of voltage is output. In this case, the comparator may receive the output and generate the Low signal.

The first current transformer 120 and the second current transformer 122 may be grounded at the secondary coil sides. The ground of the secondary coil side may be different from a ground of the primary coil side. For example, the resonant power conversion apparatus 100 may be structured such that the ground of the secondary coil side is different from the ground of the primary coil side, thereby reducing noise that may occur when a ground is shared.

Figure 2:
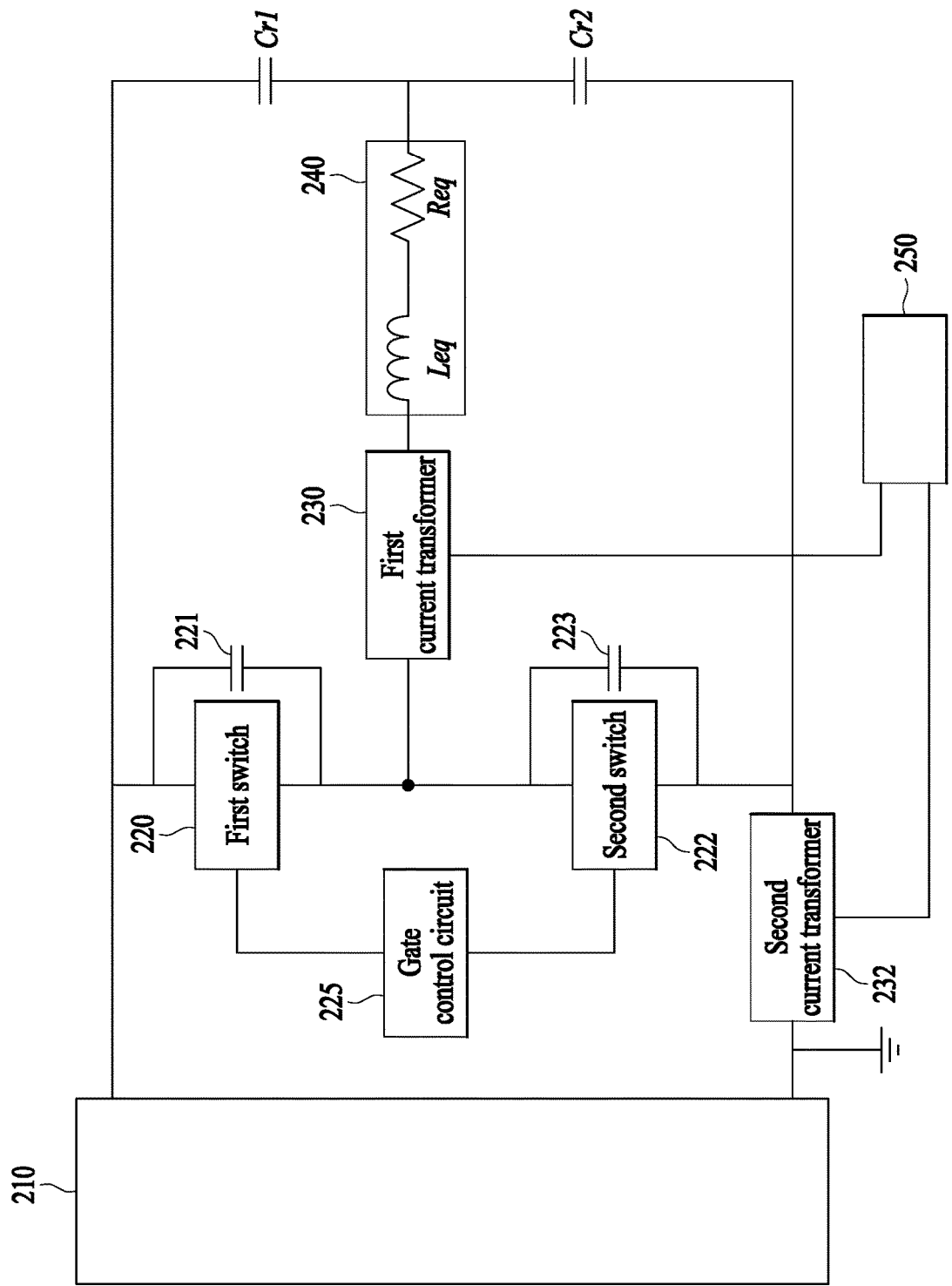
FIG. 2 is a circuit diagram illustrating a resonant power conversion apparatus according to an example.

FIG. 2 is a circuit diagram illustrating a resonant power conversion apparatus 100 according to an example. A first switch 220, a second switch 222, a gate control circuit 225, a first current transformer 230, a second current transformer 232, a load 240, and an MCU 250 of FIG. 2 may correspond to the first switch 110, the second switch 112, the gate control circuit 130, the first current transformer 120, the second current transformer 122, the load 140, and the MCU 150 of FIG. 1.

The resonant power conversion apparatus 100 may include a power source 210 to supply power. The resonant power conversion apparatus 100 may include capacitors 221 and 223 respectively connected to the first switch 220 and the second switch 222 in parallel. For example, the first current transformer 230 may be connected to the load 240 in series. In this example, a current flowing in a primary coil of the first current transformer 230 may correspond to a load current (e.g., resonant current) flowing in the load 240. The second current transformer 232 may be connected to the second switch 222 and affected by the current flowing from the second switch 222. Outputs generated in the first current transformer 230 and the second current transformer 232 may be transmitted to the MCU 250. Based on the received outputs, the MCU 250 may determine whether the non-zero voltage switching occurs.

Figure 3:
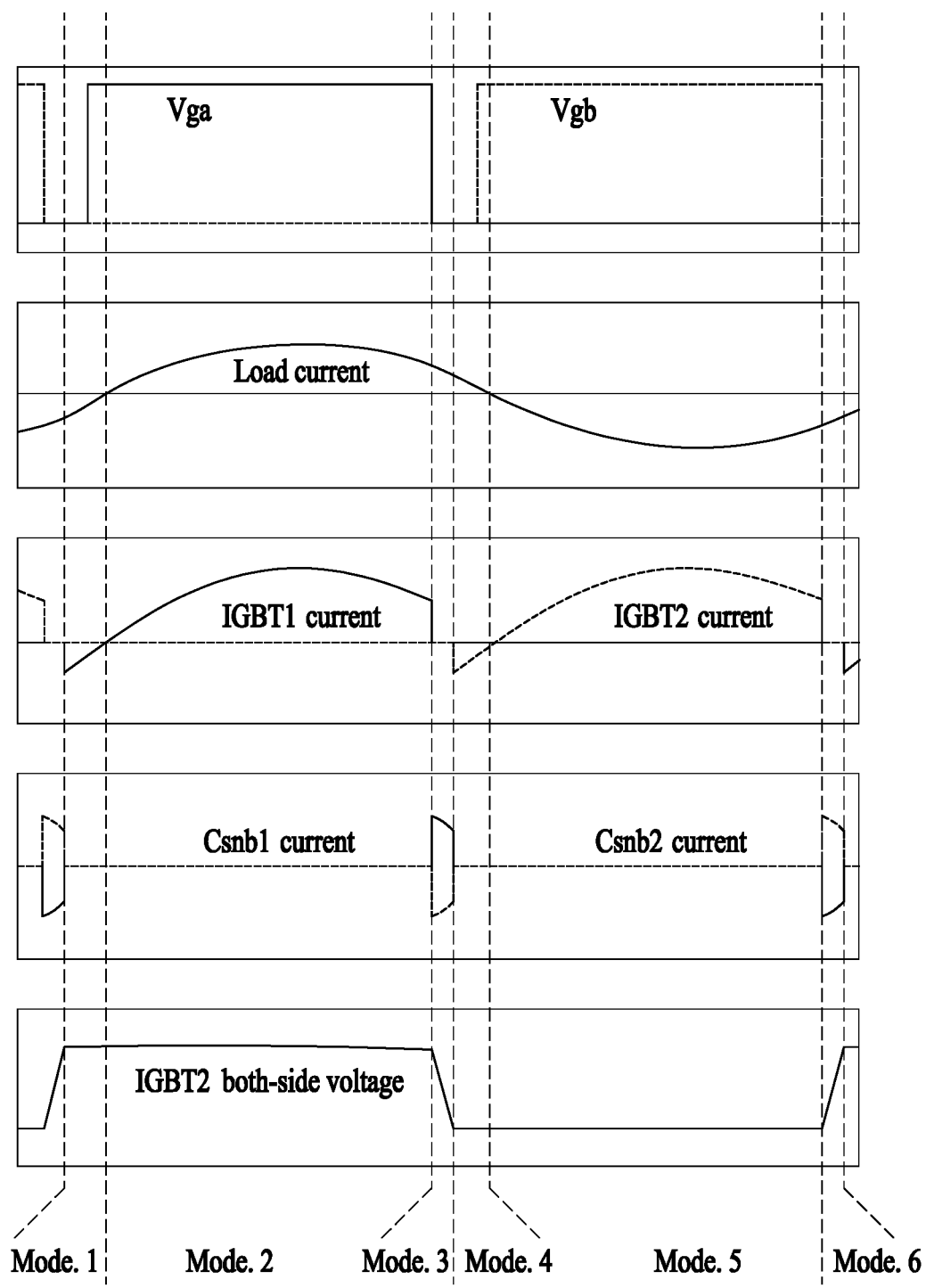
FIG. 3 is a diagram illustrating a current and a voltage of each element varying in a switching process of a resonant power conversion apparatus according to an example.

FIG. 3 is a diagram illustrating a current and a voltage of each element varying in a switching process of a resonant power conversion apparatus 100 according to an example. Referring to FIG. 3, voltages and currents of elements included in the resonant power conversion apparatus 100 may vary in a repeating pattern within a predetermined period. A change period of a voltage and current for each element of the resonant power conversion apparatus 100 may include modes 1 through 6. A switching operation of a first switch 110 and a second switch 112 performed in the modes 1 through 6 may be based on relationships with capacitors 221 and 223 connected with the first switch 110 and the second switch 112 in parallel. Related description will be made with reference to FIG. 4.

A graph of FIG. 3 shows a change in a driving voltage Vga applied to the first switch 110 and a change in a driving voltage Vgb applied to the second switch 112 of the resonant power conversion apparatus 100. The gate control circuit 130 may control an ON/Off state of the first switch 110 and the second switch 112 in a pattern as shown in the graph of FIG. 3.

In an interval of the mode 1, the gate control circuit 130 may control the first switch 110 so that a state of the first switch 110 is changed from the Off state to the On state. In an interval of the mode 2, the gate control circuit 130 may control the first switch 110 to be maintained in the On state and the second switch 112 to be maintained in the Off state. Thereafter, at a start point of an interval of the mode 3, the gate control circuit 130 may control the first switch 110 so that a state of the first switch 110 is changed from the On state to the Off state.

In an interval of the mode 4, the gate control circuit 130 may control the second switch 112 such that a state of the second switch 112 is changed from the Off state to the On state. In an interval of the mode 5, the gate control circuit 130 may control the second switch 112 to be maintained in the On state and the first switch 110 to be maintained in the Off state. Thereafter, at a start point of an interval of the mode 6, the gate control circuit 130 may control the second switch 112 so that a state of the second switch 112 is changed from the On state to the Off state.

Figure 4:
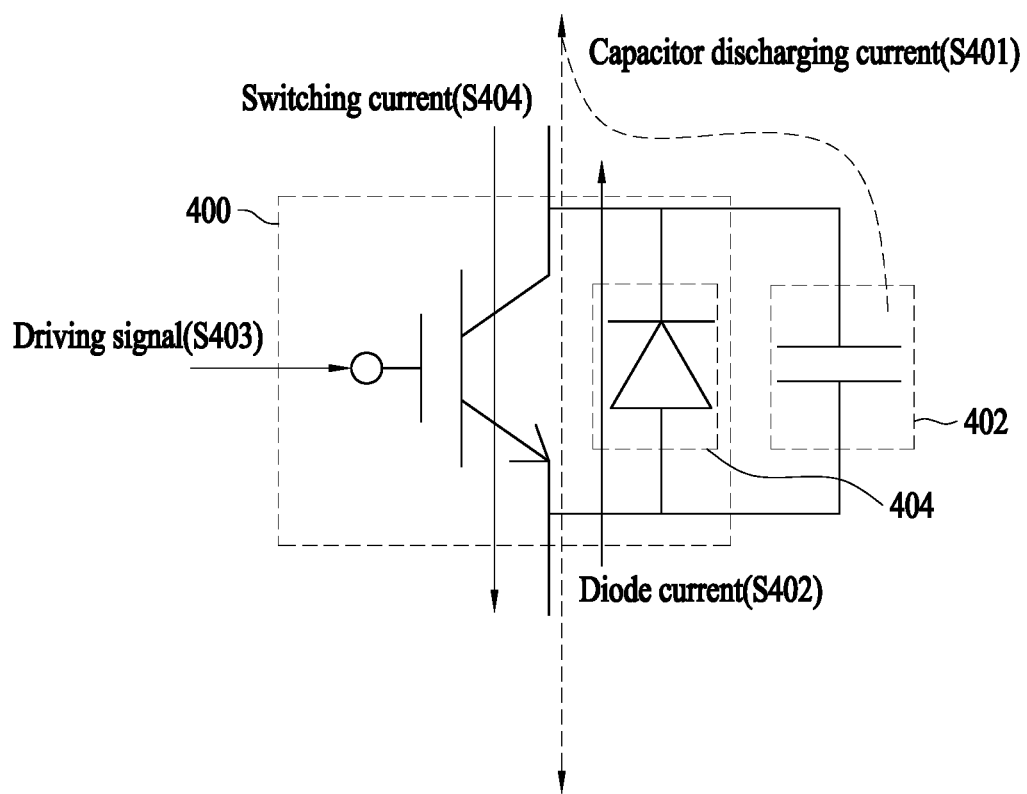
FIG. 4 is a diagram illustrating a current flow in a switching process of a first switch and a second switch in a resonant power conversion apparatus according to an example.

FIG. 4 is a diagram illustrating a current flow in a switching process of a first switch 110 and a second switch 112 in a resonant power conversion apparatus 100 according to an example embodiment. A switch 400 of FIG. 4 may correspond to one of the first switch 110 or the second switch 112 and include an inverse-direction diode 404. For ease and convenience, the following description will be based on a case in which the switch 400 of FIG. 4 corresponds to the second switch 112.

When a state of the first switch 110 is changed from the On state to the Off state in response to a driving voltage being applied, a capacitor 402 (hereinafter, also referred to as "second capacitor") connected to the second switch 112 in parallel may be discharged so that a discharging current flows in operation S401. The discharging current of the capacitor 402 may be based on a charge transfer between capacitors parallel-connected with the first switch 110 and the second switch 112. The charge transfer may occur in response to the first switch 110 entering the Off state.

When the capacitor 402 is discharged and voltages of both ends of the switch 400 reach zero, the inverse-direction diode 404 included in the switch 400 may be conductive. When a driving signal is applied to the switch 400 in operation S403 after the inverse-direction diode 404 is conductive, in operation S404, a current flowing backward through the inverse-direction diode 404 may flow through an element (for example, IGBT) to which the driving signal is applied, starting from a point in time at which a current flowing direction is switched to a forward direction.

In a case in which a driving frequency of power applied to the resonant power conversion apparatus 100 is in an inductive range, due to a phase difference between the voltage and the current, the zero voltage switching may occur when driving the first switch 110 and the second switch 112 as described with reference to FIG. 4. However, in a case in which a discharging rate of the second capacitor is reduced after an Off operation (changing from the On state to the Off state) of the first switch 110 (for example, in a case in which a magnitude of current applied to a capacitor is reduced), discharging of the capacitor may not be completed even after a point in time at which a driving signal is applied. In this case, an overshooting current may enter through the second switch 112 to which the driving signal is applied. Due to the non-zero voltage switching occurring in a situation of being driven in the inductive range, power loss may occur at the corresponding switch. The resonant power conversion apparatus 100 may adjust the driving frequency by detecting an occurrence of the non-zero voltage switching in the situation of being driven in the inductive range. Through this, the resonant power conversion apparatus 100 may ensure the zero voltage switching to be performed and, simultaneously, secure a user's convenience by reducing noise in driving.

FIGS. 5A through 5F are diagrams illustrating a current flowing in an element of a resonant power conversion apparatus 100 in a switching process of the resonant power conversion apparatus 100 according to an example. The resonant power conversion apparatus 100 may further include a power source for supplying power to a load. FIGS. 5A through 5F may correspond to circuit operations in the modes 1 through 6 of FIG. 3.

Figure 5A:
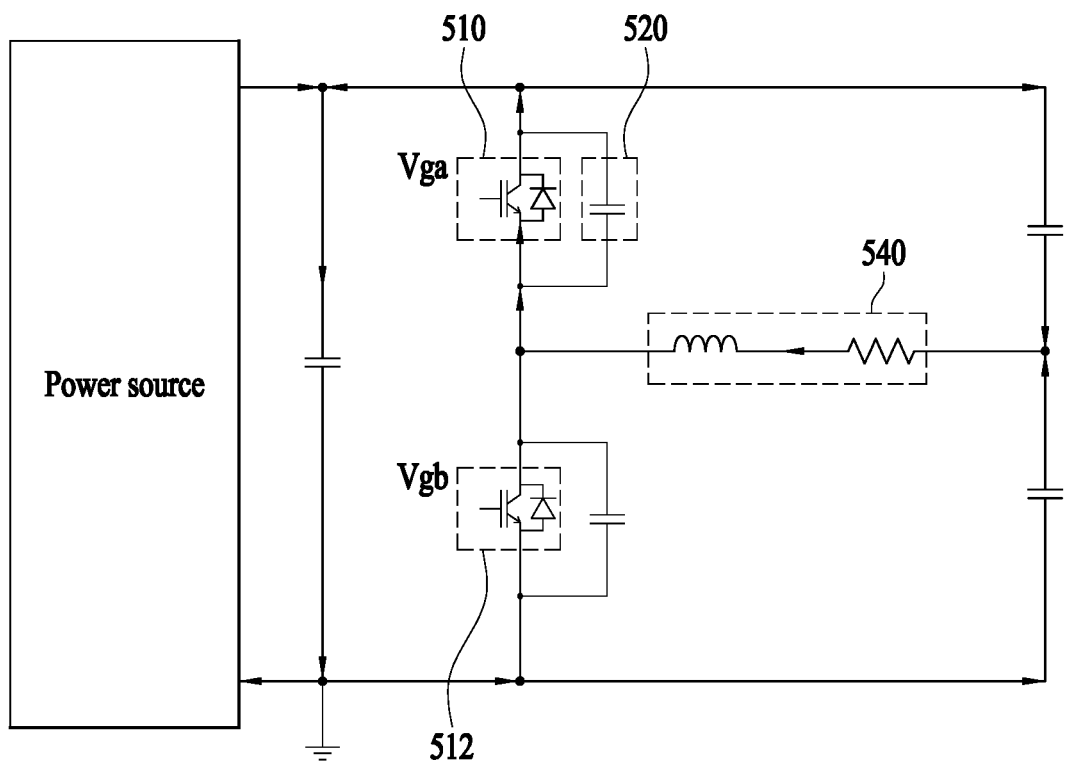
FIGS. 5A through 5F are diagrams illustrating a current flowing in an element of a resonant power conversion apparatus in a switching process of the resonant power conversion apparatus according to an example.

Referring to FIG. 5A, a current applied from the power source may be delivered to a load 540 based on operations of a first switch 510 and a second switch 512. In an interval of the mode 1, a driving signal may be applied by the gate control circuit 130 to the first switch 510. In a case in which the zero voltage switching is performed, a point in time at which the driving signal is applied to the first switch 510 may be later than a point in time at which discharging of a capacitor 520 parallel-connected with the first switch 510 is completed in the interval of the mode 1. After the discharging of the capacitor parallel-connected with the first switch 510 is completed, the current may flow through an element to which the driving signal is applied and an inverse-direction diode of the first switch 510. In a case in which the non-zero voltage switching is performed, a point in time at which the driving signal is applied to the first switch 510 may be earlier than the point in time at which the discharging of the capacitor 520 parallel-connected with the first switch 510 is completed in the interval of the mode 1. In this case, the overshooting current may flow to the first switch 510 to which the driving signal is applied.

Figure 5B:
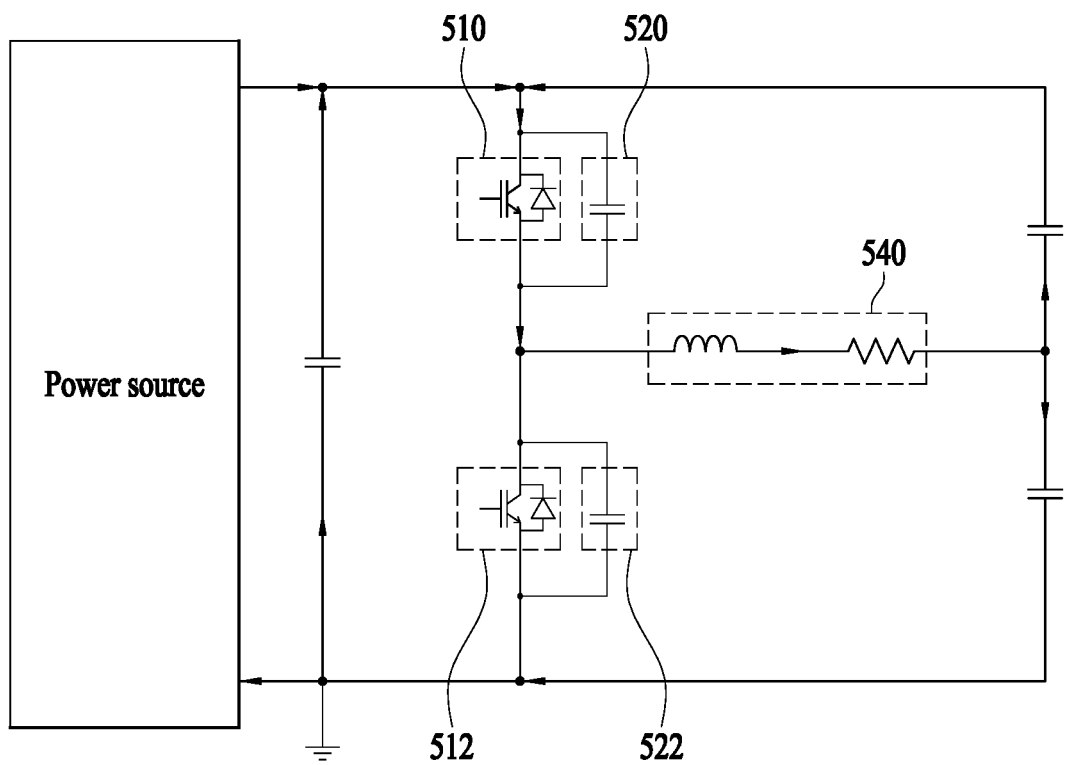

Referring to FIG. 5B, in an interval of the mode 2, a current may flow through the first switch 510 to which a driving signal is applied. In this instance, voltages on both ends of the capacitor 520 (hereinafter, referred to as "first capacitor) parallel-connected with the first switch 510 may be zero. Since the driving signal is not applied to the second switch 512, the current may not flow therein. Thus, a second capacitor 522 may be charged based on a voltage caused by other elements including the load 540. In the interval of the mode 2, the current flowing through the first switch 510 may be the same as the current flowing in the load 540.

Figure 5C:
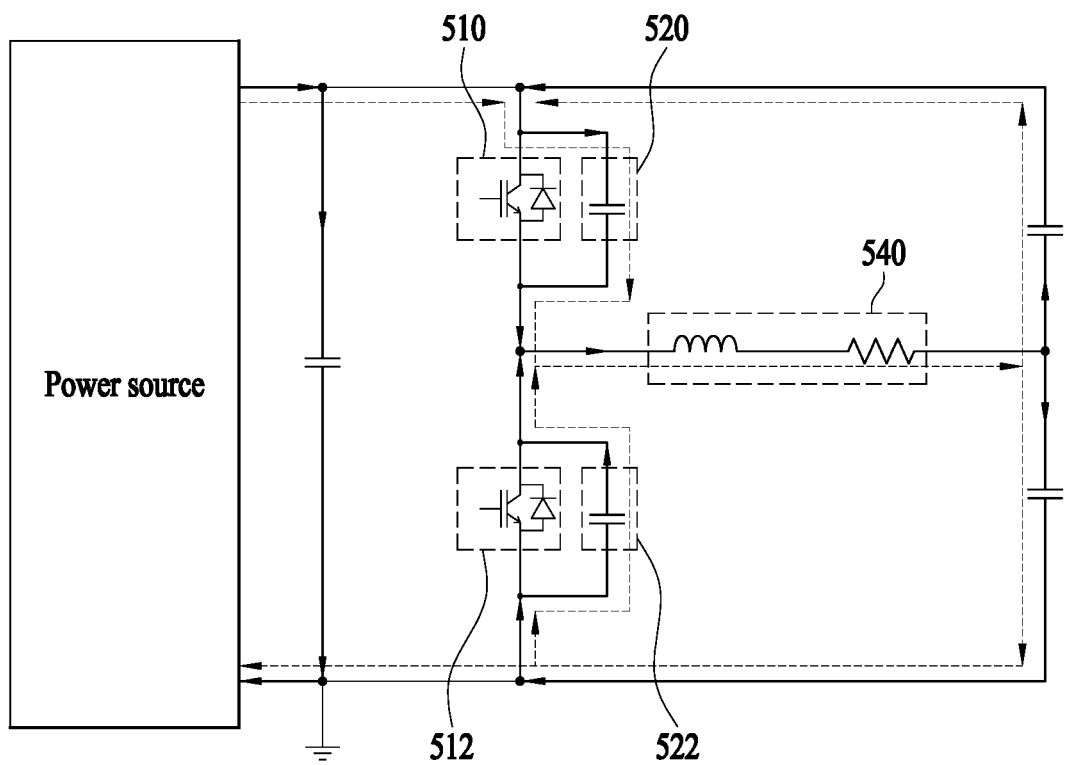

Referring to FIG. 5C, an interval of the mode 3 may be initiated when the driving signal of the first switch 510 is not applied. In response to the initiation, the current may flow in the first capacitor 520 and the second capacitor 522. The current flowing in the first capacitor 520 and the second capacitor 522 connected with the first switch 510 and the second switch 512 may vary based on a magnitude of capacitance of the corresponding capacitor. When the first switch 510 enters the Off state, the second capacitor 522 may be discharged, which may lead to decreases in the voltages on both ends of the second switch 512. It can be understood that solid and dashed lines indicate directions of the current flowing in the circuit.

Figure 5D:
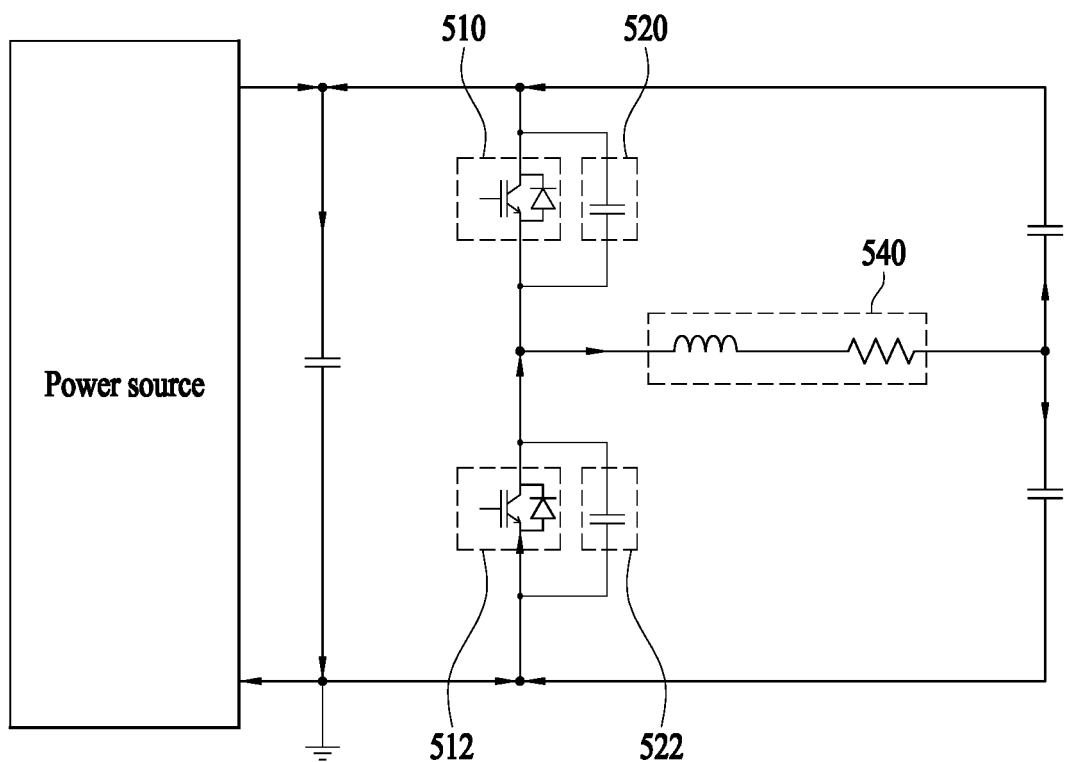

Referring to FIG. 5D, in an interval of the mode 4, the driving signal may be applied by the gate control circuit 130 to the second switch 512. In a case in which the zero voltage switching is performed, the voltages on both ends of the second switch 512 may be zero at a point in time at which the driving signal is applied to the second switch 512 in the interval of the mode 4. In a case in which the non-zero voltage switching is performed, the voltages on both ends of the second switch 512 may not be zero at a point in time at which the driving signal is applied to the second switch 512 in the interval of the mode 4. In this case, the overshooting current may flow to the second switch 512.

Figure 5E:
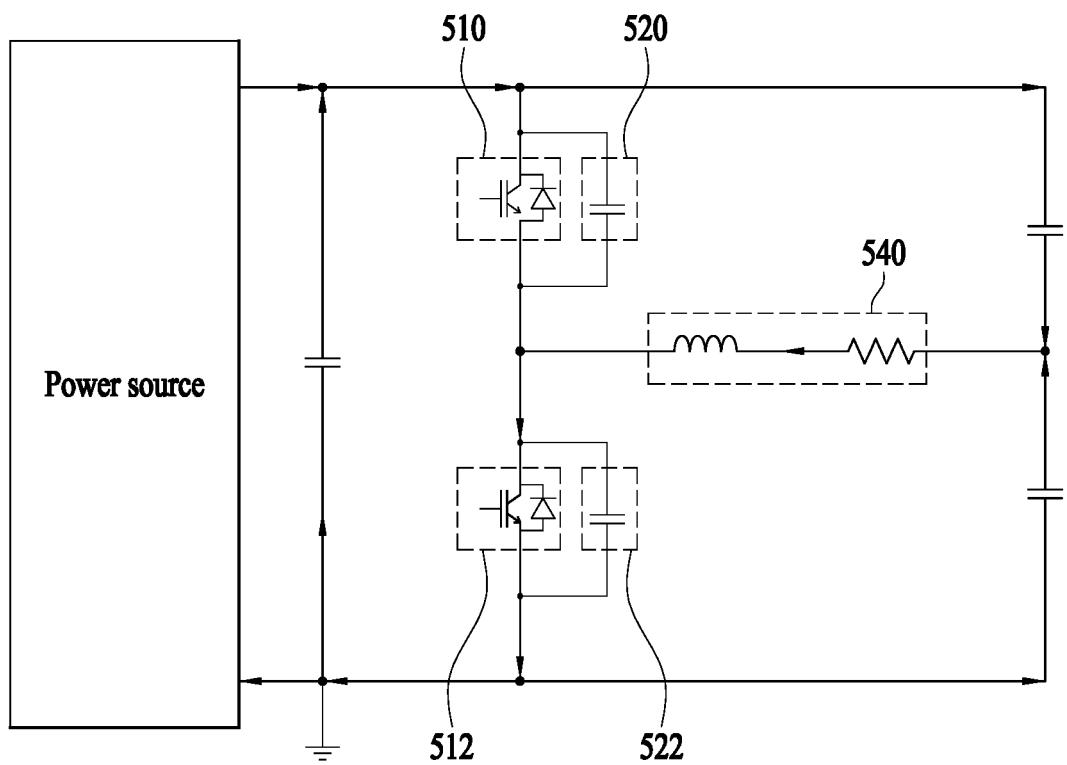

Referring to FIG. 5E, in an interval of the mode 5, the current may flow through the second switch 512 to which the driving signal is applied. In this instance, the voltages on both ends of the second capacitor 522 may be zero. Since the driving signal is not applied to the first switch 510, the current may not flow therein. Thus, the first capacitor 520 may be charged based on a voltage caused by other elements including the load 540. In the interval of the mode 5, the current flowing through the second switch 512 may be the same as the current flowing in the load 540.

Figure 5F:
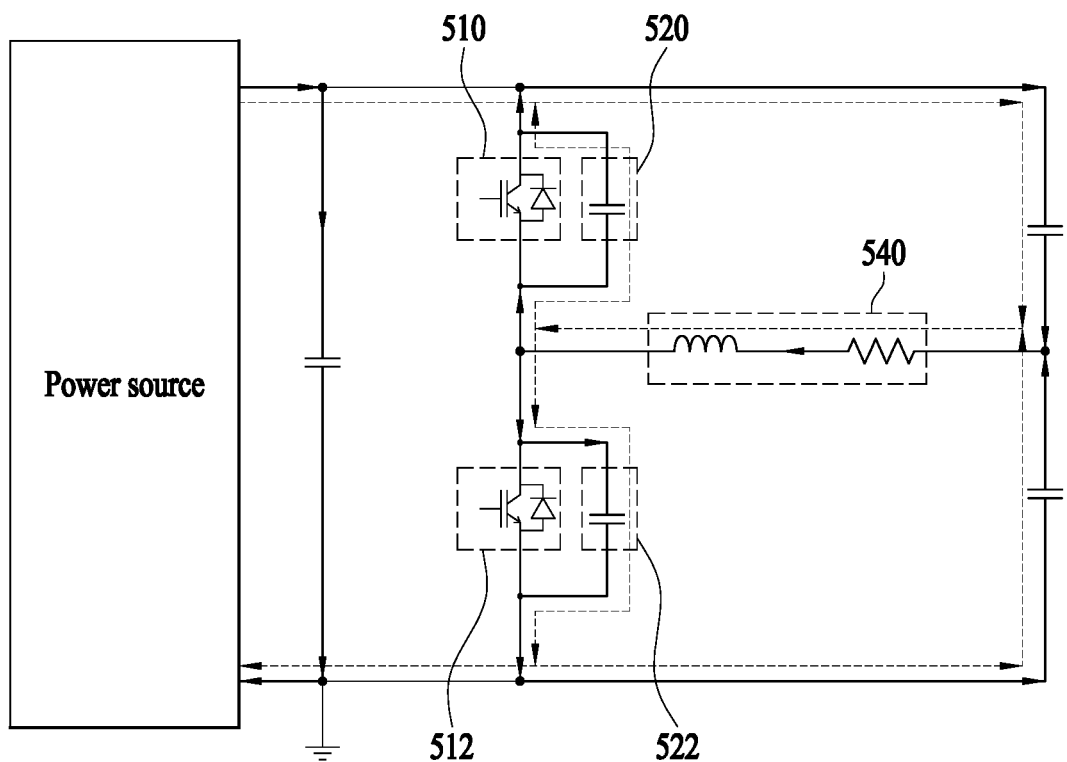

Referring to FIG. 5F, an interval of the mode 6 may be initiated when the driving signal of the second switch 512 is not applied. In response to the initiation, the current may flow in the first capacitor 520 and the second capacitor 522. The current flowing in the first capacitor 520 and the second capacitor 522 may vary based on a magnitude of capacitance of the corresponding capacitor. When the second switch 512 enters the Off state, the first capacitor 520 may be discharged, which may lead to decreases in the voltages on both ends of the first switch 510. At the same time, charging of the second capacitor 522 may be performed, so that the voltages on both ends of the second switch 512 increase. It can be understood that solid and dashed lines indicate directions of the current flowing in the circuit.

After the interval of the mode 6 ends, the resonant power conversion apparatus 100 may perform the operation corresponding to the interval of the mode 1 again. The resonant power conversion apparatus 100 may provide a resonant current to the load 140 by repeating the operations of FIGS. 5A through 5F.

Figure 6:
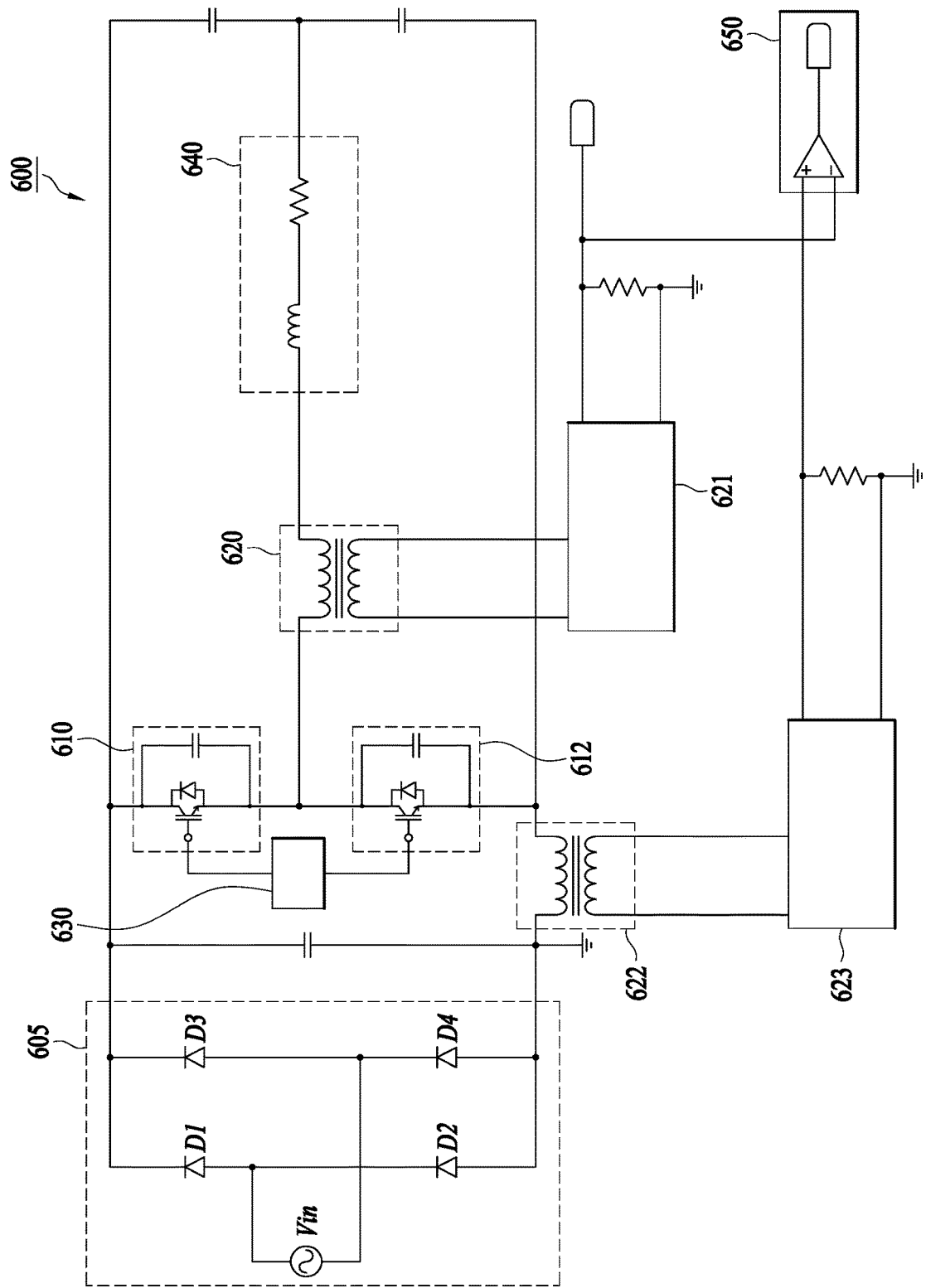
FIG. 6 is a diagram illustrating an arrangement of elements of a resonant power conversion apparatus according to an example.

FIG. 6 is a diagram illustrating an arrangement of elements of a resonant power conversion apparatus 600 according to an example. Referring to FIG. 6, the resonant power conversion apparatus 600 may include a power source 605 from which a resonant current flows to a load 640, a first switching part 610 including a first switch and a capacitor connected to the first switch in parallel, a second switching part 612 including a second switch and a capacitor connected to the second switch in parallel, a gate control circuit 630 that controls a driving signal applied to the first switching part 610 and the second switching part 612, a first current transformer 620, a load 621 of a secondary coil of the first current transformer 620, a second current transformer 622, a load 623 of a secondary coil of the second current transformer 622, the load 640 including a resistor component and an inductor component through which the resonant power conversion apparatus 600 provides the resonant current, and an MCU 650.

The first current transformer 620 and the second current transformer 622 may each include a primary coil and the secondary coil. A current applied from the power source 605 may directly flow to the primary coils of the first current transformer 620 and the second current transformer 622. The current flowing in the primary coil may be induced to the secondary coil based on a turns ratio of the primary coil and the secondary coil. In one example, the first current transformer 620 and the second current transformer 622 may have the same turns ratio.

The load 621 of the secondary coil of the first current transformer 620 and the load 623 of the secondary coil of the second current transformer 622 may be circuits including the same element. The MCU 650 may receive voltages output from a portion of one or more resistors included in the load 621 of the secondary coil of the first current transformer 620 and the load 623 of the secondary coil of the second current transformer 622. The voltages applied to the resistors on sides of the secondary coils may be output through full-wave rectification via bridge diodes included in the loads 621 and 623.

The MCU 650 may include an operational amplifier (OPAMP) as a comparator. When the voltage received from the load 621 of the secondary coil of the first current transformer 620 is greater than the voltage received from the load 623 of the secondary coil of the second current transformer 622, the comparator may output a High signal. When the voltage received from the load 621 of the secondary coil of the first current transformer 620 is less than or equal to the voltage received from the load 623 of the secondary coil of the second current transformer 622, the MCU may output a Low signal. Based on a signal output from the comparator, the MCU 650 may determine whether a non-zero voltage switching is being performed.

Figure 7:
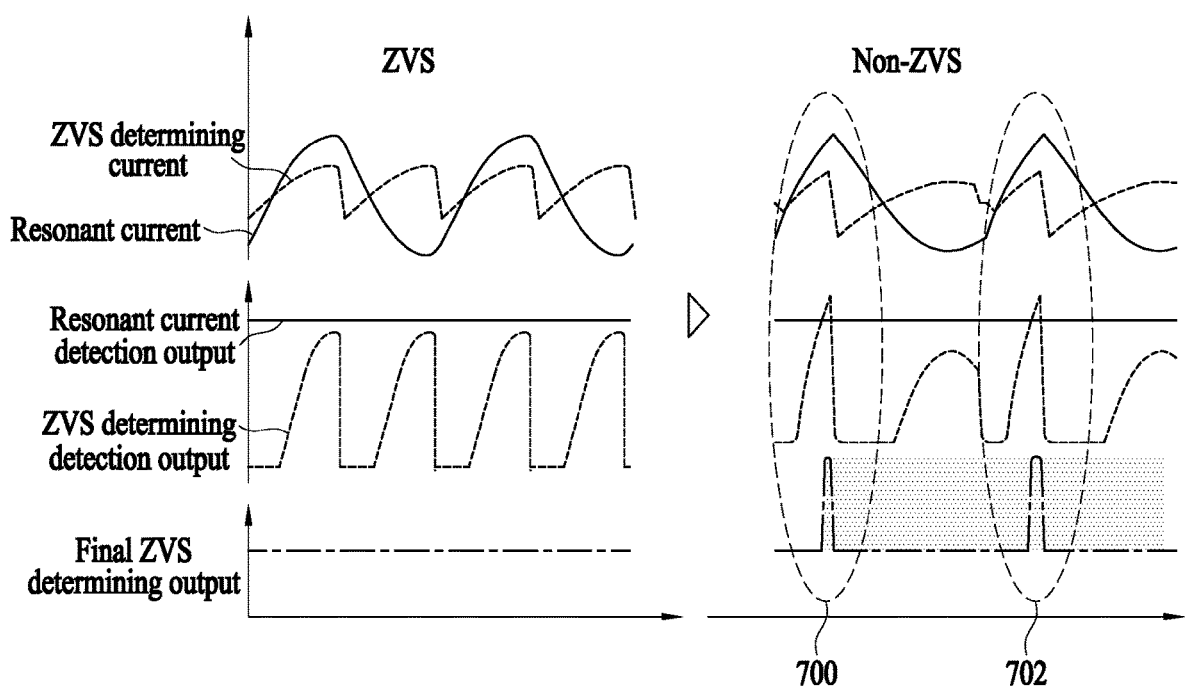
FIG. 7 is a diagram illustrating a method of determining a non-zero switching based on outputs of a first current transformer and a second current transformer of a resonant power conversion apparatus according to an example.

FIG. 7 is a diagram illustrating a method of determining a non-zero switching based on outputs of the first current transformer 120 and the second current transformer 122 of the resonant power conversion apparatus 100 according to an example. Referring to FIG. 7, in a case in which a zero voltage switching occurs, a ZVS determining detection output (e.g., output from a load 623 of a secondary coil of the second current transformer 122) generated due to currents flowing in primary coils of the first current transformer 120 and the second current transformer 122 may have a value less than or equal to a value of a resonant current detection output (e.g., output from a load 621 of a secondary coil of the first current transformer 120). Thus, when the zero voltage switching is performed, a signal output from the comparator included in the MCU 150 may be maintained as a Low signal.

In a case in which a non-zero voltage switching occurs, a ZVS determining detection output generated due to currents flowing in the primary coils of the first current transformer 120 and the second current transformer 122 may have an interval in which a value of the ZVS determining detection output is greater than a value of the resonant current detection output. Thus, when the non-zero voltage switching is performed, the comparator included in the MCU 150 may output a High signal. Also, since a switching operation is repeated, the High signal may be repetitively output as indicated by reference numerals 700 and 702. When the MCU 150 detects the High signal being output, the gate control circuit 130 may control the switching operation of the first switch 110 and the second switch 112 such that the zero voltage switching is performed. For example, as described below, the resonant power conversion apparatus 100 may set a new driving frequency instead of the current driving frequency and/or change a duty so that the zero voltage switching is performed.

The resonant power conversion apparatus 100 may detect whether the non-zero voltage switching is performed, thereby reducing a difference between a target output to be transferred to the load 140 and an actual output. For example, the resonant power conversion apparatus 100 may correspond to an induction heating type cooktop. In this example, the load 140 may be understood as an equivalent circuit including an inductor component and a resistor component formed by a heated object placed on an upper plate and a working coil of the cooktop. In some cases, the cooktop may include a plurality of working coils to inductively heat a plurality of heated objects simultaneously.

When the heated objects have different materials, working coils of positions at which the heated objects are placed may be driven at different driving frequencies. When the heated objects are inductively heated by the plurality of working coils driven at the different frequencies, interference noise (for example, 5 kilohertz (kHz)) may occur due to differences between the driving frequencies. To reduce the interference noise, the driving frequencies may be separated to have a difference of a predetermined value or more (for example, a frequency having a magnitude greater than or equal to that of an audible frequency (e.g., 20 kHz or more)). However, when the driving frequencies are separated to have the difference of the predetermined value or more, an output of a working coil that increases a driving frequency in an inductive range may be drastically reduced.

The resonant power conversion apparatus 100 may perform an asymmetric duty control (A.D.C.) on a portion of the plurality of working coils included in the load 140. The resonant power conversion apparatus 100 may set driving frequencies of the plurality of working coils corresponding to the load 140 to be the same frequency. The same frequency for driving the plurality of working coils may be an average value of a driving frequency of each of the working coils for achieving a target output. Thus, when the working coils are driven at the same driving frequency, a working coil of which a driving frequency changes to be close to a resonant frequency may be present among the plurality of working coils. The resonant power conversion apparatus 100 may perform the A.D.C. on a specific working coil. Through this, the resonant power conversion apparatus 100 may reduce a duty of an output of the working coil so that an actual output approaches a target output.

When a duty of an output of the working coil is reduced, the non-zero voltage switching may occur in a state in which the working coil is driven in the inductive range. The resonant power conversion apparatus 100 may perform detection of the non-zero voltage switching according to various embodiments described above. The resonant power conversion apparatus 100 may set a new driving frequency instead of the current driving frequency based on a detection result of the non-zero voltage switching. Also, the resonant power conversion apparatus 100 may perform a control for reaching the target output by changing a duty so that the zero voltage switching is performed while the noise is reduced.

According to the present disclosure, a resonant power conversion apparatus may determine whether a non-zero voltage switching occurs even when an inductive range includes a driving frequency which is not recognized through a typical method. According to the present disclosure, a resonant power conversion apparatus may reduce noise by separating grounds of an analog element and a digital element for detecting a non-zero voltage switching in a capacitive range and an inductive range.

According to the present disclosure, a resonant power conversion apparatus may reduce electromagnetic interference (EMI) noise while alleviating an output reduction occurring during an asymmetric duty control (A.D.C.) based on a non-zero voltage switching. In addition to the aforementioned effects, other specific effects have been described above with reference to the foregoing embodiments of the present disclosure.

An aspect of the present disclosure provides a resonant power conversion apparatus for detecting an occurrence of non-zero voltage switching even when a driving frequency is in an inductive range. Aspects of the present disclosure should not be limited to the aforementioned aspects, and other unmentioned objects and advantages will be clearly understood by those skilled in the art from the description and more clearly understood in embodiments of the present disclosure. Furthermore, the aspects of the present disclosure can be realized by means disclosed in the accompanying claims or combination thereof.

According to an aspect, there is provided a resonant power conversion apparatus including a gate control circuit configured to control a first switch to be in an On state and a second switch to be in an Off state at a first stage and control the first switch to be in the Off state and the second switch to be in the On state at a second stage, a first current transformer configured to apply a current to the first switch at the first stage and apply a current to the second switch at the second stage, a load connected to the first current transformer in series, a second current transformer connected to the second switch, and a microcontroller unit (MCU) configured to determine whether to be a zero voltage switching or a non-zero voltage switching based on a current flowing in the first current transformer and the second current transformer in a process of transitioning from the first stage to the second stage.

According to an aspect, wherein the first current transformer and the second current transformer each comprise a primary coil connected to the first switch or the second switch and a secondary coil corresponding to the first coil, and the MCU comprises a comparator to generate different outputs based on a result of comparison between a first output voltage and a second output voltage, the first output voltage being output from a load of a secondary coil of the first current transformer and the second output voltage being output from a load of a secondary coil of the second current transformer.

According to an aspect, wherein the comparator is configured to output a High signal when the second output voltage is greater than the first output voltage and output a Low signal when the second output voltage is less than equal to the first output voltage.

According to an aspect, wherein the MCU is configured to determine that a non-zero voltage switching occurs when an output generated from the comparator is a High signal. According to an aspect, wherein the MCU is configured to determine that a non-zero voltage switching occurs in response to the High signal being generated from the comparator by applying a driving voltage of the second switch when voltages of both ends of the second switch are not zero in the process of transitioning from the first stage to the second stage.

According to an aspect, wherein the MCU is configured to detect the non-zero switching occurring in a state in which a driving frequency of power applied to the resonant power conversion apparatus is included in an inductive range. According to an aspect, wherein the MCU is configured to determine that a non-zero voltage switching occurs in response to the High signal being generated from the comparator when a driving voltage is applied to the second switch after a driving voltage of the first switch is blocked and a discharging current flows in a second capacitor parallel-connected to the second switch in the process of transitioning from the first stage to the second stage.

According to an aspect, wherein the gate control circuit is configured to determine that a zero voltage switching occurs in response to the Low signal being generated from the comparator by applying a driving voltage of the second switch after voltages of both ends of the second switch reach zero in the process of transitioning from the first stage to the second stage.

According to an aspect, wherein a load of the secondary coil of the first current transformer is equal to a load of the secondary coil of the second current transformer. According to an aspect, wherein the load connected to the secondary coil comprises one or more resistors, and a voltage applied to a portion of the one or more resistors included in the load is output to the comparator.

According to an aspect, wherein the first current transformer and the second current transformer have a same turns ratio. According to an aspect, wherein the load of the secondary coil of each of the first current transformer and the second current transformer is connected to a ground separated from a circuit connected to the primary coil.

According to an aspect, wherein the first switch and the second switch are respectively connected to an inverse-direction diode and a capacitor in parallel. According to an aspect, wherein the MCU is configured to determine a variable range of a driving frequency of power applied to the resonant power conversion apparatus based on a determination that the non-zero voltage switching is performed.

According to an aspect, wherein the MCU is configured to determine a modulation range of power applied to the resonant power conversion apparatus based on a determination that the non-zero voltage switching is performed. According to an aspect, wherein the MCU is configured to control at least one of a driving frequency and a duty of the load based on a determination that the non-zero voltage switching is performed.

In one example, a resonant power conversion apparatus comprises: a gate control circuit configured to control a first switch and a second switch such that: during a first stage, the first switch is in an On state and the second switch is in an Off state, and during a second stage, the first switch is in the Off state and the second switch is in the On state; a first current transformer configured to receive a current from the first switch during the first stage and receive a current from the second switch during the second stage; a load connected to the first current transformer; a second current transformer electrically connected to the second switch; and a microcontroller unit (MCU) configured to determine, based on a first current of the first current transformer and a second current of the second current transformer, whether zero voltage switching or non-zero voltage switching is occurring when transitioning between the first stage and the second stage.

Each of the first current transformer and the second current transformer may include a primary coil connected to a respective one of the first switch or the second switch and a secondary coil corresponding to the first coil, and the MCU may include a comparator to generate different outputs based on a comparison between a first output voltage associated with a load of a secondary coil of the first current transformer and a second output voltage associated with a load of a secondary coil of the second current transformer.

The comparator may be configured to output a High signal when the second output voltage is greater than the first output voltage, and output a Low signal when the second output voltage is less than equal to the first output voltage. The MCU may be configured to determine that non-zero voltage switching occurs when the comparator outputs the High signal.

The MCU may be configured to determine that non-zero voltage switching occurs in response to the High signal being outputted by the comparator by applying a driving voltage of the second switch when voltages of leads of the second switch are not zero while transitioning from the first stage to the second stage. The MCU may be configured to determine that non-zero switching occurs when a driving frequency of power applied to the resonant power conversion apparatus is in an inductive range. The MCU may be configured to determine that non-zero voltage switching occurs in response to the High signal being outputted by the comparator when the driving voltage is applied to the second switch after a driving voltage of the first switch is blocked and a discharging current flows in a second capacitor parallel-connected to the second switch while transitioning from the first stage to the second stage.

The gate control circuit may be configured to determine that zero voltage switching occurs in response to the Low signal being outputted by the comparator by applying a driving voltage of the second switch after voltages of leads of the second switch reach zero while transitioning from the first stage to the second stage.

The load of the secondary coil of the first current transformer may correspond to the load of the secondary coil of the second current transformer. The load of the secondary coil may include one or more resistors, and a voltage applied to a portion of the one or more resistors included in the load connected to the secondary coil may be output to the comparator.

A turns ratio of the first current transformer may correspond to a turns ratio of the second current transformer. For each of the first current transformer and the second current transformer, the load of the secondary coil may be connected to a ground separated from a circuit connected to the primary coil.

Each of the first switch and the second switch may be respectively connected to an inverse-direction diode and a capacitor in parallel. The MCU may be configured to determine a variable range of a driving frequency of power applied to the resonant power conversion apparatus when non-zero voltage switching is occurring. The MCU may be configured to modulate power applied to the resonant power conversion apparatus when non-zero voltage switching is occurring.

The MCU may be configured to control at least one of a driving frequency or a duty of the load when non-zero voltage switching is occurring. The load may be associated with a working coil of an inductive cooking appliance.

In another example, a device comprises: a working coil; a first gate and a second gate that are coupled to a power source and are switched to generate an eddy current in the working coil; a first capacitor and a second capacitor provided, respectively, parallel to the first gate and the second gate; a first sensor provided between the working coil and the first and second gates and configured to output a first current based on a current provided to the working coil by switching the first gate and the second gate; a second sensor coupled to the second switch and configured to output a second current based on a reverse current through the second switch from at least one of the first capacitor or the second capacitor; and a controller configured to determine, based on the first current and the second current when non-zero voltage switching is occurring while the first gates and the second switch are being switched.

The controller may be configured to determine that non-zero voltage switching is occurring when the second current is greater than the first current. The controller may be configured modify at least one of a driving frequency or a duty of the load when non-zero voltage switching is occurring.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A resonant power conversion apparatus comprising:
    a gate control circuit configured to control a first switch and a second switch such that:
    during a first stage, the first switch is in an On state and the second switch is in an Off state, and
    during a second stage, the first switch is in the Off state and the second switch is in the On state;
    a first current transformer configured to receive a current from the first switch during the first stage and receive a current from the second switch during the second stage;
    a load connected to the first current transformer;
    a second current transformer including a primary coil and a secondary coil, wherein the primary coil of the second current transformer is provided between a common branch connected to the second switch and a ground of a side of the primary coil; and
    a microcontroller unit (MCU) configured to determine, based on a first current of the first current transformer and a second current of the second current transformer, whether zero voltage switching or non-zero voltage switching is occurring when transitioning between the first stage and the second stage.

2. The resonant power conversion apparatus of claim 1, wherein the first current transformer and includes a primary coil connected to the first switch and a secondary coil corresponding to the primary coil, and
    the MCU includes a comparator to generate different outputs based on a comparison between a first output voltage associated with a load of the secondary coil of the first current transformer and a second output voltage associated with a load of the secondary coil of the second current transformer.

3. The resonant power conversion apparatus of claim 2, wherein the comparator is configured to output a High signal when the second output voltage is greater than the first output voltage, and output a Low signal when the second output voltage is less than equal to the first output voltage.

4. The resonant power conversion apparatus of claim 3, wherein the MCU is configured to determine that non-zero voltage switching occurs when the comparator outputs the High signal.

5. The resonant power conversion apparatus of claim 4, wherein the MCU is configured to determine that non-zero voltage switching occurs in response to the High signal being outputted by the comparator by applying a driving voltage of the second switch when voltages of leads of the second switch are not zero while transitioning from the first stage to the second stage.

6. The resonant power conversion apparatus of claim 5, wherein the MCU is configured to determine that non-zero switching occurs when a driving frequency of power applied to the resonant power conversion apparatus is in an inductive range.

7. The resonant power conversion apparatus of claim 5, wherein the MCU is configured to determine that non-zero voltage switching occurs in response to the High signal being outputted by the comparator when the driving voltage is applied to the second switch after a driving voltage of the first switch is blocked and a discharging current flows in a second capacitor parallel-connected to the second switch while transitioning from the first stage to the second stage.

8. The resonant power conversion apparatus of claim 4, wherein the gate control circuit is configured to determine that zero voltage switching occurs in response to the Low signal being outputted by the comparator by applying a driving voltage of the second switch after voltages of leads of the second switch reach zero while transitioning from the first stage to the second stage.

9. The resonant power conversion apparatus of claim 2, wherein the load of the secondary coil of the first current transformer corresponds to the load of the secondary coil of the second current transformer.

10. The resonant power conversion apparatus of claim 9, wherein the load of the secondary coil includes one or more resistors, and
a voltage applied to at least a portion of the one or more resistors included in the load of the secondary coil is output to the comparator.

11. The resonant power conversion apparatus of claim 9, wherein a turns ratio of the first current transformer corresponds to a turns ratio of the second current transformer.

12. The resonant power conversion apparatus of claim 9, wherein, for each of the first current transformer and the second current transformer, the load of the secondary coil is connected to a ground separated from a circuit connected to the primary coil.

13. The resonant power conversion apparatus of claim 1, wherein the first switch and the second switch are respectively connected to an inverse-direction diode and a capacitor in parallel.

14. The resonant power conversion apparatus of claim 1, wherein the MCU is configured to determine a variable range of a driving frequency of power applied to the resonant power conversion apparatus when non-zero voltage switching is occurring.

15. The resonant power conversion apparatus of claim 1, wherein the MCU is configured to modulate power applied to the resonant power conversion apparatus when non-zero voltage switching is occurring.

16. The resonant power conversion apparatus of claim 1, wherein the MCU is configured to control at least one of a driving frequency or a duty of the load when non-zero voltage switching is occurring.

17. The resonant power conversion apparatus of claim 1, wherein the load is associated with a working coil of an inductive cooking appliance.

18. A device comprising:
a working coil;
a first gate and a second gate that are coupled to a power source and are switched to generate an eddy current in the working coil;
a first capacitor and a second capacitor provided, respectively, parallel to the first gate and the second gate;
a first sensor provided between the working coil and the first and second gates and configured to output a first current based on a current provided to the working coil by switching the first gate and the second gate;
a second sensor coupled to the second switch and configured to output a second current based on a reverse current through the second switch from at least one of the first capacitor or the second capacitor; and
a controller configured to determine, based on the first current and the second current when non-zero voltage switching is occurring while the first gates and the second switch are being switched.

19. The device of claim 18, wherein the controller is configured to determine that non-zero voltage switching is occurring when the second current is greater than the first current.

20. The device of claim 18, wherein the controller is configured to modify at least one of a driving frequency or a duty of the load when non-zero voltage switching is occurring.

* * * * *